(12) United States Patent
Göransson et al.

(10) Patent No.: US 8,842,774 B2
(45) Date of Patent: Sep. 23, 2014

(54) SIGNAL COMBINER, METHOD, COMPUTER PROGRAM AND COMPUTER PROGRAM PRODUCT

(75) Inventors: Bo Göransson, Sollentuna (SE); Martin Johansson, Mölndal (SE); Sven Petersson, Sävedalen (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/118,696

(22) PCT Filed: Jun. 1, 2011

(86) PCT No.: PCT/SE2011/050689
§ 371 (c)(1),
(2), (4) Date: Nov. 19, 2013

(87) PCT Pub. No.: WO2012/166030
PCT Pub. Date: Dec. 6, 2012

(65) Prior Publication Data
US 2014/0079156 A1    Mar. 20, 2014

(51) Int. Cl.
*H04L 27/00* (2006.01)
*H01Q 3/40* (2006.01)
*H04B 7/06* (2006.01)
*H01Q 25/00* (2006.01)
*H01Q 1/24* (2006.01)

(52) U.S. Cl.
CPC ............ *H04B 7/0617* (2013.01); *H01Q 3/40* (2013.01); *H01Q 25/001* (2013.01); *H01Q 1/246* (2013.01)
USPC ........................................ 375/299; 375/267

(58) Field of Classification Search
CPC ...... H04B 7/10; H04B 7/0857; H04B 7/0891; H04B 7/0617; H01Q 25/001; H01Q 3/08; H01Q 3/40
USPC .................... 375/299, 347, 349, 267
See application file for complete search history.

(56) References Cited

U.S. PATENT DOCUMENTS 6,057,806 A * 5/2000 Lopez ............................ 343/890
6,167,286 A * 12/2000 Ward et al. ................. 455/562.1
(Continued)

FOREIGN PATENT DOCUMENTS

CN    101848471 A    9/2010
WO    2010059186 A1    5/2010
(Continued)

OTHER PUBLICATIONS

Huawei, "Performance evaluation of 2 TX antennas network", 3GPP TSG RAN WG1 Meeting #57bis, Los Angeles, USA, Jun. 29, 2009, pp. 1-4, R1-092745, 3GPP, US.

(Continued)

*Primary Examiner* — Emmanuel Bayard
(74) *Attorney, Agent, or Firm* — Coats & Bennett, P.L.L.C.

(57) ABSTRACT

A signal combiner for combining transmission signals to be supplied to four antennas devices, wherein two of the antenna devices are polarized in a first orientation and two of the antenna devices are polarized in a second orientation essentially orthogonal to the first orientation. The signal combiner comprises: four input connections arranged to receive the transmission signals; four output connections arranged to drive a respective one of the four of antenna devices using respective output signals. The signal combiner is arranged to combine transmission signals supplied on each input connection to all of the four output connections using beam forming and phase adjustment, such that, in use, each supplied transmission signal generates a central beam polarized in the first orientation and a side beam polarized in the second orientation. It is also presented a corresponding method, computer program and computer program product.

14 Claims, 2 Drawing Sheets

(56) References Cited

U.S. PATENT DOCUMENTS

| | | | |
|---|---|---|---|
| 6,252,559 B1* | 6/2001 | Donn | 343/781 CA |
| 6,356,771 B1* | 3/2002 | Dent | 455/562.1 |
| 6,469,680 B1* | 10/2002 | Kelliher | 343/893 |
| 6,870,515 B2* | 3/2005 | Kitchener et al. | 343/853 |
| 7,697,958 B2* | 4/2010 | Mohamadi | 455/562.1 |
| 8,063,822 B2* | 11/2011 | Adams et al. | 342/373 |
| 8,254,998 B2* | 8/2012 | Khojastepour | 455/561 |
| 8,362,955 B2* | 1/2013 | Adams et al. | 342/373 |
| 2003/0073463 A1* | 4/2003 | Shapira | 455/562 |
| 2003/0122709 A1* | 7/2003 | Jeon et al. | 342/372 |
| 2003/0162566 A1* | 8/2003 | Shapira et al. | 455/561 |
| 2005/0030249 A1* | 2/2005 | Gabriel et al. | 343/853 |
| 2005/0143037 A1* | 6/2005 | Stratis et al. | 455/277.1 |
| 2006/0068848 A1 | 3/2006 | Shapira et al. | |
| 2006/0176974 A1* | 8/2006 | Smith et al. | 375/267 |
| 2007/0099578 A1* | 5/2007 | Adeney et al. | 455/69 |
| 2007/0205955 A1* | 9/2007 | Korisch et al. | 343/853 |
| 2008/0117105 A1* | 5/2008 | Chen et al. | 342/427 |
| 2008/0303699 A1* | 12/2008 | Zhang et al. | 375/302 |
| 2009/0149146 A1* | 6/2009 | Emrick et al. | 455/277.2 |
| 2009/0224990 A1* | 9/2009 | Cezanne et al. | 343/726 |
| 2009/0322608 A1* | 12/2009 | Adams et al. | 342/368 |
| 2010/0045494 A1* | 2/2010 | Clerckx et al. | 341/106 |
| 2010/0277394 A1* | 11/2010 | Haustein et al. | 343/876 |
| 2010/0283703 A1* | 11/2010 | Chen | 343/836 |
| 2012/0001801 A1* | 1/2012 | Adams et al. | 342/368 |
| 2012/0007789 A1* | 1/2012 | Petersson et al. | 343/876 |
| 2012/0098695 A1* | 4/2012 | Fox | 342/159 |
| 2012/0275499 A1* | 11/2012 | Anreddy et al. | 375/219 |
| 2012/0319900 A1* | 12/2012 | Johansson et al. | 342/368 |
| 2012/0319920 A1* | 12/2012 | Athley et al. | 343/853 |
| 2013/0113658 A1* | 5/2013 | Adams et al. | 342/373 |
| 2013/0324068 A1* | 12/2013 | Ghassemzadeh et al. | 455/277.1 |

FOREIGN PATENT DOCUMENTS

| | | |
|---|---|---|
| WO | 2011019310 A1 | 2/2011 |
| WO | 2011050866 A1 | 5/2011 |
| WO | 2012039659 A1 | 3/2012 |

OTHER PUBLICATIONS

Nokia Siemens Netowrks et al , "Dealing with UTRA UEs in 2-Tx antenna environment", 3GPP TSG-RAN WG1 Meeting #57bis, Los Angeles, USA, Jun. 29, 2009, pp. 1-2, R1-092827, 3GPP, US.

* cited by examiner

SIGNAL COMBINER, METHOD, COMPUTER PROGRAM AND COMPUTER PROGRAM PRODUCT

TECHNICAL FIELD

The invention relates generally to a signal combiner for combining transmission signals to be supplied to antenna devices.

BACKGROUND

Recently, 2Tx antennas have been introduced into WCDMA (Wideband Code Division Multiple Access) and HSPA (High Speed Packet Access) networks in order to support MIMO (Multiple-Input Multiple-Output) transmissions.

WO2006/071153 presents one known way to implement 2Tx MIMO. It is disclosed, an antenna device for a radio base station in a cellular telephony system, which comprises a first and a second input connection for a first and a second data stream, and a first and a second polarization former, one for each of said data streams. The device also comprises a first and a second antenna of respective first and second polarizations, and one amplifier each. The device also comprises a first and a second combiner, so that the outputs from the polarization formers may be combined as input to each of the first and second antennas.

4-layer MIMO transmission in HSDPA has been proposed. However, no feasible solution for how this is solved in a transmission antenna is presented in the prior art. In particular, there is no known solution of how to provide support for one, two and four layers, while providing good sector coverage and power distribution between antennas for all these scenarios.

SUMMARY

An object is to provide a solution for supporting one, two and four layer MIMO transmission, wherein both good sector coverage and power distribution between power amplifiers is provided.

According to a first aspect, it is presented a signal combiner for combining transmission signals to be supplied to four antennas devices, wherein two of the antenna devices are polarised in a first orientation and two of the antenna devices are polarised in a second orientation essentially orthogonal to the first orientation. The signal combiner comprises: four input connections arranged to receive the transmission signals; four output connections arranged to drive a respective one of the four of antenna devices using respective output signals. The signal combiner is arranged to combine transmission signals supplied on each input connection to all of the four output connections using beam forming and phase adjustment, such that, in use, each supplied transmission signal generates a central beam polarised in the first orientation and a side beam polarised in the second orientation. This allows the introduction of 4Tx transmission in e.g. WCDMA/HSPA without creating an unbalance between power amplifiers, which results in lower requirements on power amplifiers compared to if the power amplifiers are more unevenly used. At the same time, 2TX transmission and 1Tx transmission is also balanced between power amplifiers. In this way, less expensive and smaller power amplifiers can be utilised. Moreover, this solution also provides great sector coverage.

The signal combiner may be arranged to provide the central beam of each supplied transmission signal by providing each supplied transmission signal with the same phase to two antenna assemblies polarised in the same orientation, and to provide the side beam of each supplied transmission signal by providing each supplied transmission signal with a phase difference of $\pi$ to two antenna assemblies polarised in the same orientation.

A transfer function of the signal combiner may be described by:

$$\begin{bmatrix} a_1 \\ a_2 \\ a_3 \\ a_4 \end{bmatrix} = F \cdot \begin{bmatrix} t_1 \\ t_2 \\ t_3 \\ t_4 \end{bmatrix}$$

where a1-a4 represents the output signals such that a1 and a2 are arranged to be respectively provided to the antenna devices polarised in the first orientation and a3 and a4 are arranged to be respectively provided to the antenna devices polarised in the second orientation, t1-t4 represents the transmission signals and F is a 4×4 matrix comprising elements all being of the same magnitude.

F may be arranged such that the rows of F are orthogonal to each other.

Each element of F may be one of two real numbers, where the two real numbers respectively may be the additive inverse of each other.

The two numbers may be 1 and −1.

F may be described by:

$$F_0 = k \cdot \begin{bmatrix} 1 & 1 & 1 & 1 \\ 1 & -1 & 1 & -1 \\ 1 & 1 & -1 & -1 \\ -1 & 1 & 1 & -1 \end{bmatrix}$$

where k is a scalar.

The magnitude of k may be ½. This results in a signal combiner where no amplification is performed.

The signal combiner may be implemented using digital processing.

The signal combiner may be implemented using analogue components.

The signal combiner may support precoded multiple input multiple output, MIMO, signals on the four input connections.

The first orientation may be a first linear orientation and the second orientation may be a second linear orientation, perpendicular to the first linear orientation.

A second aspect is a method, executed in a signal combiner, for combining transmission signals to be supplied to four antennas devices, wherein two of the antenna devices are polarised in a first orientation and two of the antenna devices are polarised in a second orientation, essentially orthogonal to the first orientation, the signal combiner comprising: four input connections arranged to receive the transmission signals; and four output connections arranged to drive a respective one of the four antenna devices using respective output signals. The method comprises: combining transmission signals supplied on each input connection to all of the four output connections using beam forming and phase adjustment, such that each supplied transmission signal generates a central beam polarised in the first orientation and a side beam polarised in the second orientation.

A third aspect is a computer program for, in a signal combiner, combining transmission signals to be supplied to four antennas devices, wherein two of the antenna devices are polarised in a first orientation and two of the antenna devices are polarised in a second orientation, essentially orthogonal to the first orientation, the signal combiner comprising: four input connections arranged to receive the transmission signals; and four output connections arranged to drive a respective one of the plurality of antenna devices using respective output signals. The computer program comprises computer program code which, when run on a signal combiner, causes the signal combiner to: combine transmission signals supplied on each input connection to all Of the four output connections using beam forming and phase adjustment, such that each supplied transmission signal generates a central beam polarised in the first orientation and a side beam polarised in the second orientation.

A fourth aspect is a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown.

This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
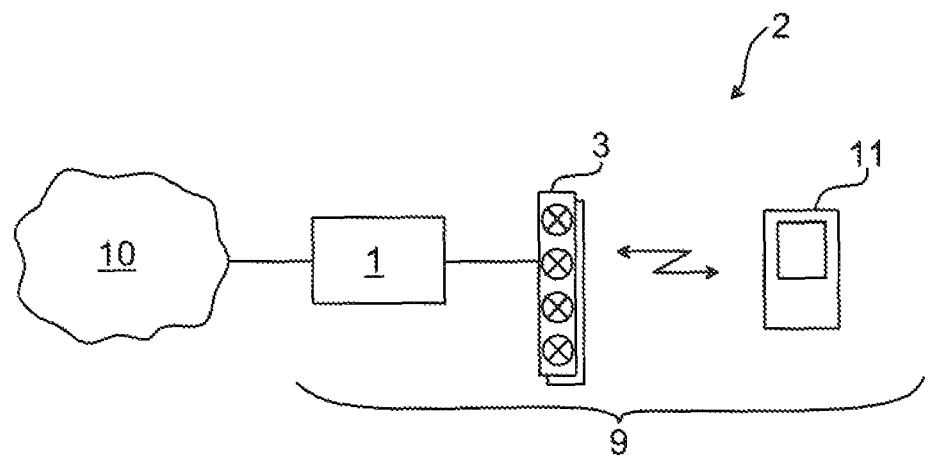
FIG. 1 is a schematic diagram showing some components of a mobile communication network.

FIG. 1 is a schematic diagram showing some components of a mobile communication network 2. The mobile communications network 2 comprises a core network 10 and a signal combiner 1. Although not shown here, the signal combiner 1 can be implemented as part of a Base Transceiver Station (BTS) 1, alternatively known as a NodeB, or a radio base station. The signal combiner is connected to an antenna arrangement 3 for communication with at least one user device 11. The signal combiner 1, the antenna arrangement 3, and the at least one user device 11 form part of a Multiple-Input Multiple-Output (MIMO) system 9.

Figure 2:
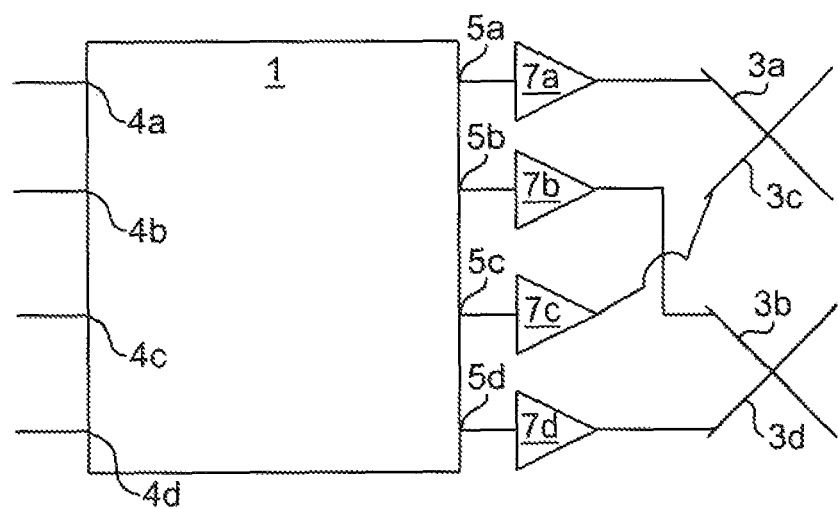
FIG. 2 shows an embodiment of the signal combiner of FIG. 1 with some connected components.

FIG. 2 shows at embodiment of the signal combiner 1 of FIG. 1 with some connected components. In this example, the signal combiner comprises four input connections 4a-d. The transmission signals provided on the input connections 4a-d can already have been precoded for MIMO transmission. Moreover, not all input connections need to be loaded with a transmission signal at all times. For example, a single layer input (1Tx) can be provided e.g. on input connection 4c, or a dual layer input (2Tx) can be provided on input connections 4b and 4d. All four input connections 4a-d can also be loaded with quadruple layer MIMO transmission (4Tx).

For transmission, the combiner network combines the transmission signal or signals provided on the input connections 4a-d and distributes signals on all four output connections 5a-d. The output connections 5a-d are respectively connected to four power amplifiers 7a-d, which are each connected to respective antenna devices 3a-d. How this works will be explained in more detail with reference to FIG. 4 below, but the idea is that transmission signals are distributed between the output connections to distribute the load on the power amplifiers 7a-d. The antenna device 3a is polarised in a first orientation and the antenna device 3c is polarised in a second orientation, essentially orthogonal to the first orientation. The first and second orientations can, for instance, be linear, mutually perpendicular, orientations. Analogously, the antenna device 3b is polarised in the first orientation and the antenna device 3d is polarised in the second orientation.

Figure 3:
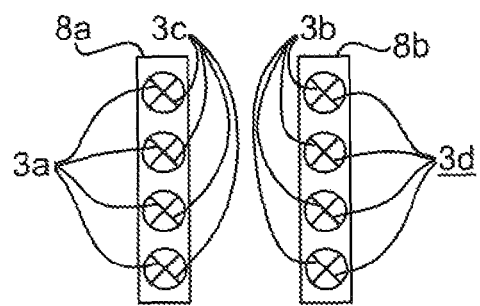
FIG. 3 is a schematic drawing illustrating one embodiment of the antenna devices of FIG. 2.

FIG. 3 is a schematic drawing illustrating one embodiment of the antenna devices 3a-3d of FIG. 2. Here a first antenna assembly 8a comprises a column of antennas elements. Each antenna element comprises two antennas, respectively polarised in the first orientation and the second orientation.

In this way, the antenna device 3a of FIG. 2 is implemented by all antennas of the first antenna assembly 8a being polarised in the first orientation, and the antenna device 3c of FIG. 2 is implemented by all antennas of the first antenna assembly 8a being polarised in the second orientation. Analogously, the antenna device 3b of FIG. 2 is implemented by all antennas of the second antenna assembly 8b being polarised in the first orientation, and the antenna device 3d of FIG. 2 is implemented by all antennas of the second antenna assembly 8b being polarised in the second orientation.

This provides a way for each antenna device 3a-3d to be implemented each using a plurality of antennas, where all antennas of the same antenna device 3a-3d are connected to the same respective output signal.

Figure 4:
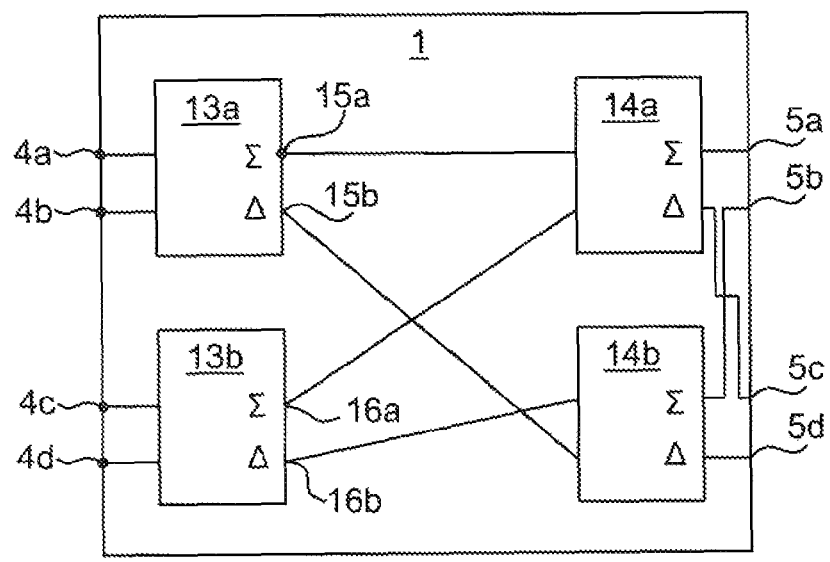
FIG. 4 is a schematic diagram of one embodiment of the signal combiner of FIGS. 1 and 2.

FIG. 4 is a schematic diagram of one embodiment of the signal combiner 1 of FIGS. 1 and 2. Transmission signals are provided on the input connections 4a-d. The transmission signals are represented by a vector t comprising elements [$t_1$, $t_2$, $t_3$, $t_4$], such that the elements of t are respectively provided on the input connections 4a-d. Output signals are provided on the output connections 5a-d; the output signals are represented by a vector a comprising elements [$a_1$, $a_2$, $a_3$, $a_4$]. The elements of the output vector a are respectively provided on the output connections 5a-d. The signal combiner can thus be described as a=F·t, where F is a matrix describing the transfer function of the signal combiner 1.

One logical implementation of the transfer function is shown in FIG. 4. This implementation is only logical and can, but does not need to, have corresponding physical or logical modules, as long as an equivalent transfer function is achieved.

The signal combiner 1 comprises four logical modules 13a-b, 14a-b. Each one of these logical modules has two module inputs and two module outputs. A first module output is a sum output Σ, where a sum of the two inputs is provided. A second module output is a difference output Δ, providing the upper module input minus the lower module input.

A first logical module 13a thus provides a sum output 15a of $t_1+t_2$ and a difference output 15b of $t_1-t_2$.

Analogously, a second logical module 13a provides a sum output 16a of $t_3+t_4$ and a difference output 16b of $t_3-t_4$.

A third logical module 14a has inputs from the sum output 15a of the first logical module 13a and the sum output 16a from the second logical module 13b. The third logical module 14a thus provides a sum output 5a of $t_1+t_2+t_3+t_4$ and a difference output 5c of $t_1+t_2-t_3-t_4$.

A fourth logical module 14b has inputs from the difference output 16b of the second logical module 13b and the difference output from the first logical module 13a. The fourth logical module 14b thus provides a sum output 5b of $t_1-t_2+t_3-t_4$ and a difference output 5d of $-t_1+t_2+t_3-t_4$.

The function of the signal combiner 1 can be written More compactly as follows:

$$\begin{bmatrix} a_1 \\ a_2 \\ a_3 \\ a_4 \end{bmatrix} = F \cdot \begin{bmatrix} t_1 \\ t_2 \\ t_3 \\ t_4 \end{bmatrix} \quad (1)$$

where F is here chosen to be $$F_0 = k \cdot \begin{bmatrix} 1 & 1 & 1 & 1 \\ 1 & -1 & 1 & -1 \\ 1 & 1 & -1 & -1 \\ -1 & 1 & 1 & -1 \end{bmatrix}$$

and the vector a represents the antennas, fed through the connections shown in FIG. 2, k is a scalar constant and can be selected to be such that such that there is no amplification by the signal combiner. In this example, k is selected to be ½.

Through the connections to the antennas shown in FIG. 2, the antenna device 3a, polarised in the first orientation, thus transmits $t_1+t_2+t_3+t_4$, and the antenna device 3b, also polarised in the first orientation, thus transmits $t_1-t_2+t_3-t_4$. For RF signals polarised in the first orientation for the transmission signal $t_1$, the two antenna devices 3a-b thus collectively send out $t_1$ and $t_1$, respectively. As known in the art per se, the signals sent out from the two antenna devices 3a-b cooperate, forming a centre beam for $t_1$ polarised in the first orientation.

Analogously for the two antenna devices 3a-b thus Collectively send out $t_3$ and $t_3$, respectively, forming a centre beam for $t_3$ for a signal polarised in the first orientation.

For the transmission signal $t_2$, the two antenna devices 3a-b collectively send out $t_2$ and $-t_2$, respectively. When there is a location difference between the two antenna devices 3a-b, a pair of side beams will be formed for $t_2$, where the signal is greatly reduced or cancelled in a direction perpendicular to a line between the two antenna devices 3a-b, and instead there are side beams which are formed on the sides, where the signals from the antenna devices 3a-b collectively form a positive contribution. It is to be noted that centre beams occur if the signals applied to the antennas have the same phase and side beams occur if the signals applied to the antennas have a phase difference of π. There can also be a phase difference between antennas 3a and 3b and the same difference between 3c and 3d. However, the beams, seen per polarisation, will no longer be true centre and side beams. Instead the beam directions will be shifted whereas the power pattern, the sum of the power in the two beams, will still have the same shape. Such a phase difference can, if desired, also be included in the matrix $F_0$ which would then have different values. In other words, the example matrix $F_0$ above has zero phase shift, but $F_0$ could equally well have a non-zero phase shift.

Analogously for $t_4$, the two antenna devices 3a-b thus collectively send out $t_4$ and $-t_4$, respectively, forming a pair of side beams centre beam for $t_4$ for a signal polarised in the first orientation.

If the same analysis is applied for the two antenna devices 3c-d which are polarised in the second orientation, $t_1$ forms a pair of side beams by $t_1$ and $-t_1$, respectively, $t_2$ forms a centre beam by $t_2$ and $t_2$, respectively, $t_3$ forms a side beam by $-t_3$ and $t_3$ with a phase difference of π from $t_1$, and $t_4$ forms a centre beam by $-t_4$ and $-t_4$ with a phase difference of π from $t_2$.

The outputs are summarised in the following table:

TABLE 1

Transmission signals and resulting beams

| Transmission signal | Polarisation | Combined signal | Beam type |
|---|---|---|---|
| $t_1$ | first orientation | $+t_1$ and $+t_1$ | centre |
| $t_1$ | second orientation | $+t_1$ and $-t_1$ | side |
| $t_2$ | first orientation | $+t_2$ and $-t_2$ | side |
| $t_2$ | second orientation | $+t_2$ and $+t_2$ | centre |
| $t_3$ | first orientation | $+t_3$ and $+t_3$ | centre |
| $t_3$ | second orientation | $-t_3$ and $+t_3$ | side (reverse) |
| $t_4$ | first orientation | $+t_4$ and $-t_4$ | side |
| $t_4$ | second orientation | $-t_4$ and $-t_4$ | centre (reverse) |

One consequence of this structure is that each transmission signal results in one centre and one pair of side beams, which provides excellent sector coverage. One signal of particular importance is the pilot signal. The user device uses this to detect an antenna port. With the presented solution, orthogonal (or at least substantially uncorrelated) pilot signals (represented by $t_1$ to $t_4$) are transmitted from each antenna port. At the same time, each combined beam should have the same coverage area, i.e. through the centre and peripheral beams.

It is to be noted that if F is chosen to be any other configuration of elements, the structure of FIG. 4 would have to be modified.

The magnitude of the elements of $F_0$ is selected to be 1 to equally load the power amplifiers. This provides a load on all power amplifiers regardless of how many transmission signals are provided to the signal combiner, at least in the situation where the transmission signals $t_1$-$t_4$ are uncorrelated.

F has elements of two different values. While the values of $F_0$ are real numbers, the values of F can also be complex numbers, as long as the phase difference between the two different values is π.

The rows of F can be orthogonal, as illustrated by $F_0$. All elements of $F_0$ can be multiplied by the same complex number. One special case of this is that all elements are multiplied with −1, i.e. each element is the additive inverse of the respective elements of $F_0$.

The signal combiner 1 can be implemented using digital processing, e.g. using ASICs (Application Specific Integrated Circuits), FPGA (Field-Programmable Gate Array), a DSP (Digital Signal Processor) or even a CPU (Central Processing Unit), e.g. in a baseband device. Alternatively or additionally, the signal combiner can be implemented using analogue components.

Since the signals are distributed over the four antenna devices regardless of if there are one, two or four transmission signals, the same components for power amplifiers and antenna devices can be used e.g. for WCDMA systems (two or four transmission signals), LTE systems (four transmission Signals) or even GSM (Global System for Mobile Communication) systems (one transmission signal). This provides excellent upgradeability for systems and can even combine signals from various systems in the same antenna structure, such as GSM and LTE, with good distribution between power amplifiers.

Figure 5:
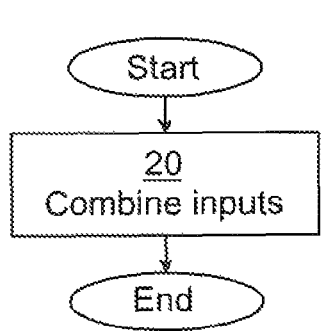
FIG. 5 is a flow chart illustrating a method performed by a signal combiner 1 e.g. of FIG. 1, 2 or 4.

FIG. 5 is a flow chart illustrating a method performed by a signal combiner 1 e.g. of FIG. 1, 2 or 4. The method comprises one step 20 to combine all four transmission signals supplied on each input 4a-d to all of the four output connections 5a-d using beam forming and phase adjustment, such that each supplied transmission signal generates a central beam polarised in the first orientation and a side beam polarised in the second orientation, whereby the polarisation and phase adjustment allows differentiation between the transmission signals.

Figure 6:
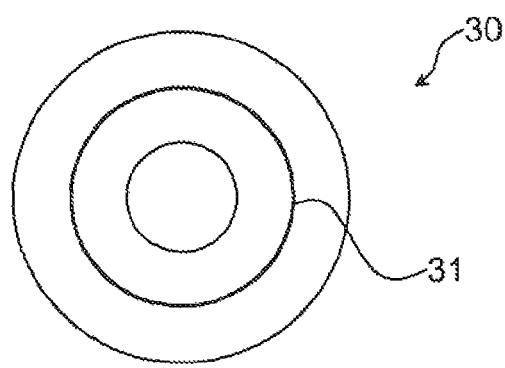
FIG. 6 shows one example of a computer program product comprising computer readable means.

FIG. 6 shows one example of a computer program product 30 comprising computer readable means. On this computer readable means, a computer program 31 can be stored, which computer program 31 can cause a computer to execute the method according to embodiments described herein. In this example, the computer program product is an optical disc, such as a CD (compact disc), a DVD (digital versatile disc) or a Blu-ray disc. The computer readable means can also be solid state memory, such as flash memory or a software package distributed over a network, such as the Internet. The computer readable means can hold a computer program 31 for methods of the signal combiner.

It is to be noted that while four input connections and four output connections are presented herein, the same principle can be extended to more input connections and output connections, such as eight input connections and eight output connections.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A signal combiner for combining transmission signals to be supplied to four antenna devices, wherein two of the antenna devices are polarized in a first orientation and two of the antenna devices are polarized in a second orientation that is essentially orthogonal to the first orientation, the signal combiner comprising:
four input connections arranged to receive the transmission signals; and
four output connections, each arranged to drive a respective one of the four antenna devices using respective output signals;
wherein the signal combiner is configured to combine transmission signals supplied on each input connection to all of the four output connections using beam forming and phase adjustment, such that, in use, each supplied transmission signal generates a central beam polarized in the first orientation and a side beam polarized in the second orientation.

2. The signal combiner of claim 1, wherein the signal combiner is configured to:
provide the central beam of each supplied transmission signal by providing each supplied transmission signal with the same phase to two antenna assemblies polarized in the same orientation; and
provide the side beam of each supplied transmission signal by providing each supplied transmission signal with a phase difference of $\pi$ to two antenna assemblies polarized in the same orientation.

3. The signal combiner of claim 1, wherein the signal combiner is configured to apply the following transfer function when combining transmission signals:

$$\begin{bmatrix} a_1 \\ a_2 \\ a_3 \\ a_4 \end{bmatrix} = F \cdot \begin{bmatrix} t_1 \\ t_2 \\ t_3 \\ t_4 \end{bmatrix}$$

wherein $a_1$ -$a_4$ represent the output signals such that the signal combiner is configured to provide $a_1$ and $a_2$ to the antenna devices polarized in the first orientation, and to provide $a_3$ and $a_4$ to the antenna devices polarized in the second orientation;
wherein $t_1$ -$t_4$ represent the transmission signals; and
wherein F is a 4×4 matrix comprising elements all having the same magnitude.

4. The signal combiner of claim 3, wherein the rows of F are orthogonal to each other.

5. The signal combiner of claim 3:
wherein each element of F is one of two real numbers; and
wherein the two real numbers are the additive inverse of each other.

6. The signal combiner of claim 5, wherein the two numbers are 1 and −1.

7. The signal combiner of claim 3, wherein F is described by:

$$F = k \cdot \begin{bmatrix} 1 & 1 & 1 & 1 \\ 1 & -1 & 1 & -1 \\ 1 & 1 & -1 & -1 \\ -1 & 1 & 1 & -1 \end{bmatrix}$$

wherein k is a scalar.

8. The signal combiner of claim 7, wherein the magnitude of k is ½.

9. The signal combiner of claim 1, wherein the signal combiner is implemented using digital processing.

10. The signal combiner according of claim 1, wherein the signal combiner is implemented using analog components.

11. The signal combiner of claim 1, wherein the signal combiner supports precoded multiple input multiple output (MIMO) signals on the four input connections.

12. The signal combiner of claim 1, wherein the first orientation is a first linear orientation and the second orientation is a second linear orientation that is perpendicular to the first linear orientation.

13. A method, executed by a signal combiner, for combining transmission signals to be supplied to four antenna devices, wherein two of the antenna devices are polarized in a first orientation and two of the antenna devices are polarized in a second orientation that is essentially orthogonal to the first orientation, the signal combiner comprising four input connections configured to receive the transmission signals, and four output connections configured to drive a respective one of the four antenna devices using respective output signals, the method comprising:

combining transmission signals supplied on each input connection to all of the four output connections using beam forming and phase adjustment, such that each supplied transmission signal generates a central beam polarized in the first orientation and a side beam polarized in the second orientation.

14. A computer program product stored in a non-transitory computer-readable medium for combining transmission signals to be supplied to four antenna devices, wherein two of the antenna devices are polarized in a first orientation and two of the antenna devices are polarized in a second orientation that is essentially orthogonal to the first orientation, the signal combiner comprising four input connections configured to receive the transmission signals and four output connections configured to drive a respective one of the plurality of antenna devices using respective output signals, the computer program product comprising software instructions which, when run by a signal combiner, configures the signal combiner to:

combine transmission signals supplied on each input connection to all of the four output connections using beam forming and phase adjustment, such that each supplied transmission signal generates a central beam polarized in the first orientation and a side beam polarized in the second orientation.

* * * * *